Feb. 26, 1952   W. L. KAEHNI ET AL   2,587,481
ELECTRON COMPASS
Filed March 30, 1944   3 Sheets-Sheet 1
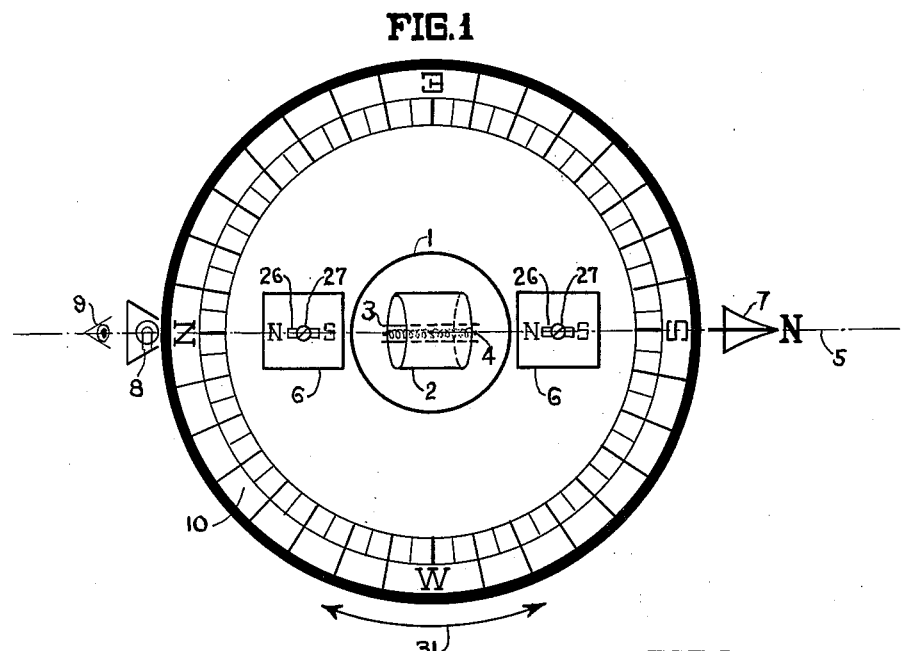
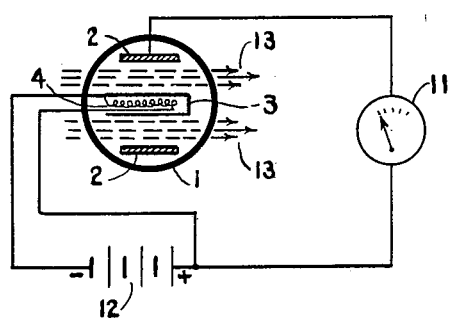
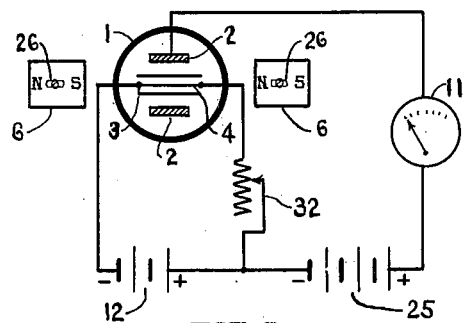
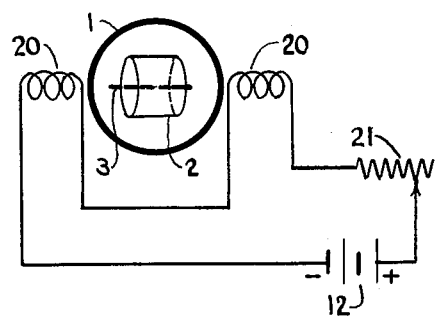
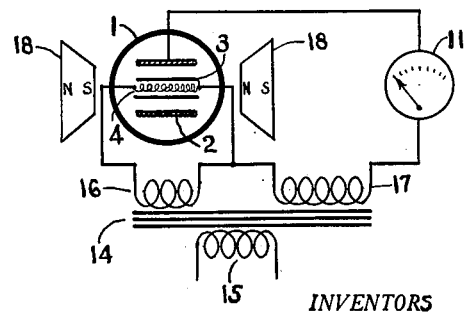
INVENTORS
William L. Kaehni
Frank J. Kaehni Feb. 26, 1952 W. L. KAEHNI ET AL 2,587,481
ELECTRON COMPASS
Filed March 30, 1944 3 Sheets-Sheet 2

INVENTORS
William L. Kaehni
Frank J. Kaehni

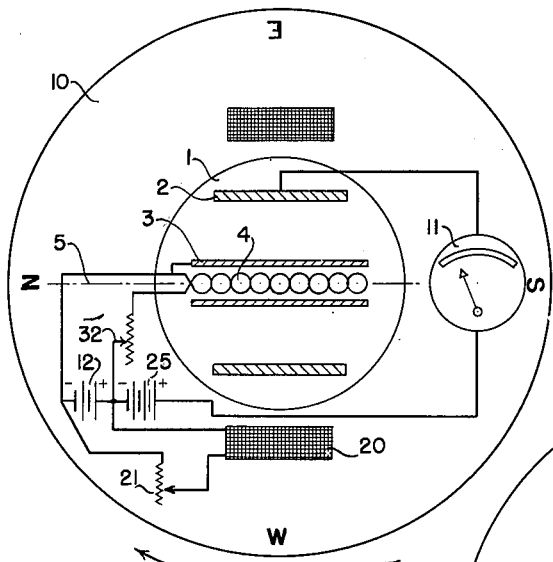
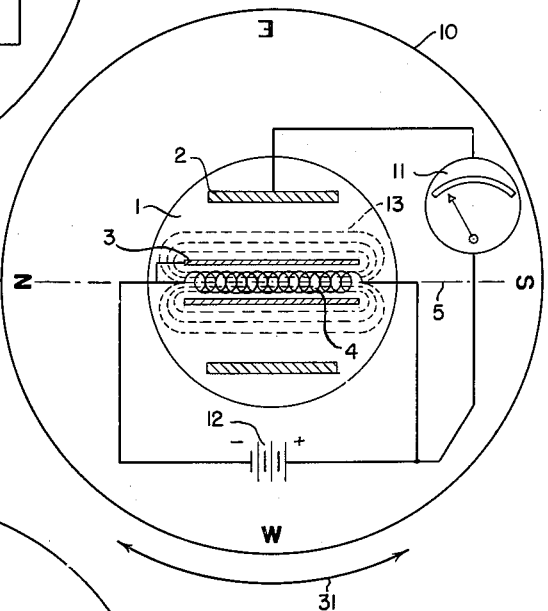
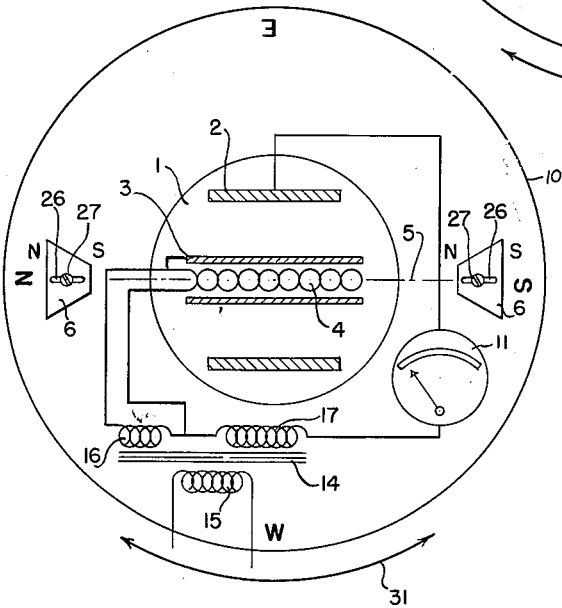

Patented Feb. 26, 1952

2,587,481

UNITED STATES PATENT OFFICE 2,587,481

ELECTRON COMPASS

William L. Kaehni and Frank J. Kaehni, Cleveland, Ohio; Frank J. Kaehni executor of said William L. Kaehni, deceased Application March 30, 1944, Serial No. 528,689

5 Claims. (Cl. 33—204)

This invention relates to a novel compass and the like, responsive to the earth's magnetic field, which is both more rugged and sensitive than the usual delicately balanced magnetic needle type of compass.

The general object of the invention is to provide an improved compass device useful to give directional indications and also to control steering mechanisms on ships, aircraft, and other vehicles, by electronic means sensitive to the direction of the earth's magnetic field.

Specifically, the object is to provide an electrical system for the above stated purpose utilizing the behavior of low velocity electrons in a vacuum under the influence of magnetic lines of force to detect directions in space with great accuracy, and a further object is to provide a novel magnetron type of vacuum tube having a low temperature equi-potential cathode and a low voltage anode, and system utilizing same so as to respond to very weak magnetic fields, such as the earth's magnetic field. Our invention may be used to directionally detect, measure or determine the polarity of very weak magnetic fields. While reference is hereafter made to the detection of such fields, it will be understood that our invention will also function to measure and determine the polarity of such weak magnetic fields as well.

In carrying out the above objects it is a still further object to provide a relatively rugged apparatus of low cost manufacture which eliminates the necessity of damping, delicate pivot bearings, and other sources of error and unreliable operation which necessitate frequent recalibration in conventional compasses.

Other objects are to provide an apparatus of inherent stability which is capable of easy calibration and adjustment and which will not be adversely affected by rough movement or acceleration forces, and the like.

With the foregoing and other objects in view, the invention resides in the combination of elements and in the details of construction hereinafter set forth in the following specification and appended claims, certain embodiments thereof being illustrated in the accompanying drawings, in which:

Figure 1 is a schematic plan view of one embodiment of my invention showing the movable components thereof arranged for rotation in a horizontal plane for direction indication, Figure 2 is a circuit diagram for operation of the compass tube shown in Figure 1 on a single battery, the elements of the tube being shown in longitudinal section, Figure 3 is a circuit diagram employing separate batteries for heating the cathode and supplying anode potential in the compass tube.

Figure 4 illustrates a modification having a variable strength auxiliary field established by direct current field coils instead of permanent magnets, Figure 5 shows a modification utilizing an alternating current power supply for the compass tube, and permanent auxiliary field magnets designed to concentrate the earth's magnetic field, Figure 6 is a partial longitudinal section view of a modified form of compass tube wherein the auxiliary magnetic field is produced by the cathode heater coil, Figure 7 is a similar view of a form of tube employing a non-inductive cathode heater where the tube is supplied with an external auxiliary field coil, Figure 8 shows a modified form of compass tube having the anode in the center of and concentric with the heater and cathode, which latter two elements are in the form of a cylinder.

Figure 11 is a schematic view of a first preferred embodiment of the invention complete as to details of the vacuum tube construction and circuit connections;

Figure 12 is a schematic view of a second preferred embodiment having a different form of vacuum tube and a different circuit arrangement; and Figure 13 is a schematic view of a third preferred embodiment showing in detail the circuit connections and vacuum tube construction.

Figure 6:
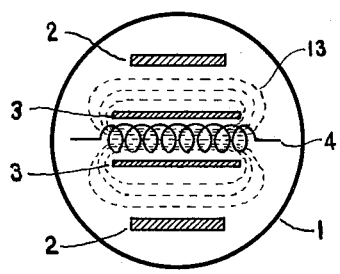

In the present system the principal component, the compass tube, consists of a special form of vacuum tube employing the principles of the magnetron. However, the tube at present preferred differs in constructional features which are necessary for operation according to the principles of the invention.

The magnetron as employed in the past was used to generate electrical oscillations or to rectify or amplify alternating currents. In our modifications as disclosed in this invention we employ certain characteristics of this general form of tube to measure, compare and orient weak magnetic lines of force in space and have found that compass readings can be obtained by the direct interaction of magnetic lines of force and thermionic currents.

A tube in which the anode comprises a section of a cylinder of short length works well, and this cylindrical anode is preferably made of non-magnetic material, because magnetic materials produce some distortion of a uniform magnetic field. Instead of using a filament as in the conventional magnetron, we prefer a unipotential cathode of conventional material activated to liberate electrons from its surface upon being heated in a vacuum and having enclosed within its structure the filament heating circuit. A filament type cathode, however, is satisfactory in some cases as will be explained later. In any event, we prefer to operate the cathode at a relatively low temperature so as to impart a low initial velocity to the electrons emanating therefrom.

We have also found that for response to low magnetic field strengths of only a fraction of one gauss we must employ a comparatively low anode voltage. The same battery can, therefore, be used (which may be a six volt storage battery) for both filament and plate potential. The cathode, however, is connected to the negative terminal, and the plate or anode is connected through an indicating device to the positive terminal of this same battery.

In practice we have found that the plate current from the central cathode to the anode can reach the cut off value when very weak magnetic fields are allowed to pass through the tube along its axis, providing the distance from anode to cathode, that is the anode radius, is made greater than in conventional tubes, and when the plate or anode potentials are made very low. In such cases, the electrons emanating from the relatively low temperature cathode and very slightly attracted to the positive anode by electrostatic attraction have relatively low velocities and are turned back to the cathode due to the magnetic field at right angles to the direction of electron motion from cathode to anode.

It is known to persons skilled in the art that moving electrons in a vacuum are deflected under the influence of a magnetic field in such a way that in a vacuum tube with a cylindrical anode and centrally located heated cathode the electrons follow curved paths from cathode to anode when the magnetic field is parallel to the axis of the tube. If the magnetic field is of sufficient strength for a given anode voltage the electrons are deflected in curved paths back to the cathode and no anode current flows. If, however, the field is made weaker, or the plate potential made greater, the electrons will again cause an anode current to flow. Symmetrical construction of the elements of the tube, such as central spacing of the cathode within the ring anode, and circular structure of the anode, are important factors, as are also rather large distances for electron travel between cathode and anode.

By reason of the above described valve action of the tube, the electron flow to the anode may be made to vary in accordance with the orientation of the tube in the earth's magnetic field, so as to indicate direction. In order to distinguish between north and south directions, in either of which orientations of the tube equal magnetic flux would flow therethrough, we employ an auxiliary magnetic field of low field strength to either assist or oppose the earth's magnetic flux and thus produce different resultant field strengths for the two opposite senses in the north and south direction. This auxiliary magnetic field is essential also for the proper operation of the tube on the best part of its characteristic curve.

The auxiliary field may be produced by permanent magnets, or by a small electro-magnetic coil or a coiled filament carrying direct current and aligned with the axis of the tube. The auxiliary field in any event is permanently aligned with the axis of the compass tube and may be adjusted to the desired intensity by means of a rheostat or by altering the positioning of the permanent magnets. The direction with respect to true magnetic north is found by measurement of the anode current or by rotating the tube to produce a signal in response to maximum or minimum anode current. The compass tube and its associated auxiliary field may be accordingly mounted on a compass card or the like for rotation in a horizontal plane to obtain a significant indication or signal from the variation in anode current.

Referring now to the specific embodiment of the invention shown in Figure 1, the numeral 1 indicates a vacuum tube which will hereinafter be referred to as the compass tube. This tube contains a cylindrical anode 2 and a central concentric cathode 3 having a heater 4, the axis of these elements, indicated by the line 5, being in line with small external permanent magnets 6. The tube and magnets are mounted in the relationship shown on a compass card 10 which is rotatable in a horizontal plane. In the position shown in Figure 1 the earth's magnetic field, represented by the arrow 7, traverses the compass tube 1 along its axis from left to right whereas the auxiliary magnetic field of the magnets 6 opposes the earth's field. The magnets 6 are so adjusted by screws 27 in slots 26 that they produce a combined or resultant magnetic flux through the tube which is too weak to deflect the electrons from the cathode away from the anode at the fixed anode potential employed, when the auxiliary field is in opposition to the earth's field. The numeral 8 designates a lamp arranged to be energized in response to electron current flow in the compass tube under the above described condition so that an observer at 9 then sees the N (north) marking on the compass card 10.

When, however, the entire assemblage carried by the card 10 is rotated through some angle from the position of Figure 1 the resultant magnetic flux through the tube will increase and this increase in flux will reduce the electron current sufficiently to cause the indicator 8 to reduce in brightness or to go out for all other positions. The double ended arrow 31 indicates the two directions of rotation in a horizontal plane which may be imparted to the card 10 to cause it to assume such other positions. The previously mentioned axis 5 of the cylindrical anode passes through the center of the cathode and will be hereinafter referred to as the axis of the compass tube. This is also the axis of the auxiliary field magnets 6, or field coils to be hereinafter described.

It is understood that the compass unit is kept in a horizontal plane, namely the plane of the paper in Figure 1, so that only the horizontal component of the earth's field is effective for directional readings, and any conventional means for mounting a compass in a level position may be employed. The electrical connections to the unit in Figure 1 are omitted for sake of clearness but these may be either flexible leads or sliding contacts.

Figures 2, 3 and 5 disclose circuit diagrams for the compass tube wherein the indicating element is represented as a current indicator 11 which may be a micro-ammeter or milliammeter, in which case the current readings are observed as a maximum when the compass card is in the north-pointing position, as explained above. An observer can then determine any direction or course by a compass reading designating the angle from the north position. It is thereby understood that the lamp 8 and the milliammeter 11 are interchangeable in the circuits of Figures 2, 3 and 5 so that either type of indicating device may be used in the organization shown in Figure 1.

The batteries 12 and 25 necessary for heating the filament or cathode and for supplying the anode potential may be carried by the card 10 so as to obviate the necessity for flexible leads or other external connections with the rotating element. For small portable units the entire unit can be self-contained in this manner.

Since the anode voltage is comparatively low for the reasons previously mentioned, the same battery, which may be a six-volt storage battery, may be used for both filament and plate potentials, as illustrated in Figure 2. Here, the cathode is connected to the negative terminal of the battery 12 which energizes the heater filament 4, and the plate or anode is connected through the indicating device 11 to the positive terminal of the same battery. The magnetic lines of force of the auxiliary field are indicated by dotted lines 13 parallel to the axis of the tube and through the evacuated space in the tube where the electrons flow from the heated cathode 3 to the surrounding cylindrical anode 2. The anode 2 is represented in a sectional view cutting the anode cylinder longitudinally so as to show the cathode element 3 positioned centrally therewithin, along the axis of the anode cylinder, herein referred to as the axis of the tube. The circuit of Figure 2 is of special convenience for use with vehicular batteries but other single voltage sources may, of course, be utilized in this system, such as flashlight cells, etc., for small portable compasses. Likewise a single high voltage source may be used by suitably adjusting the requirements of the tube.

In Figure 3 the battery 12 is used only for heating the cathode, the temperature of which may be controlled by rheostat 32, the rheostat functioning as an off-on switch to turn off the instrument. A separate battery 25 supplies anode potential and is connected through the instrument 11 in the manner shown.

Figure 4 discloses an embodiment employing small direct current coils 20 for producing the auxiliary magnetic field along the axis of the tube, in place of the permanent magnets 6. The strength of this auxiliary field may be accurately adjusted by rheostat 21 and the cathode heater battery 12 may be used as the source of energy.

Figure 5 discloses an embodiment wherein the circuit components are energized by alternating current from the transformer 14. This transformer is provided with a primary winding 15, a cathode heating secondary 16 and an anode potential winding 17. Permanent auxiliary field magnets 18 are used and are disclosed in this form of the invention as being of conical shape to concentrate the earth's field through the tube for more sensitive response.

Figure 6 discloses an embodiment wherein the cathode heating filament 4 is coiled inductively to produce the desired auxiliary magnetic field along the axis of the tube. This field is illustrated by dotted lines 13 linking the heating coil and passing between the cathode and anode elements, it being understood that these elements are of concentric cylindrical form as previously described.

Figure 7:
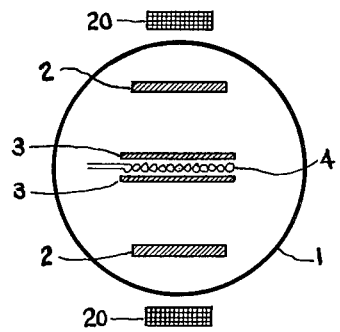

Figure 7 discloses a physical construction for the system shown in Figure 4, having a single auxiliary field coil 20 surrounding the tube 1 and coaxial with the cathode and anode elements. In this case the cathode heating element 4 is shown doubled back on itself so as to be non-inductive.

Figure 8:
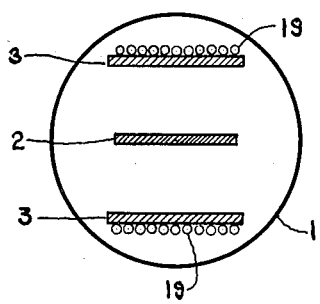

Another form of tube is shown in Figure 8 wherein the cathode surrounds the anode. Here the anode 2 takes the form of a small central rod within a cylindrical cathode 3 which is surrounded by a cathode heater winding 19.

Figure 9:
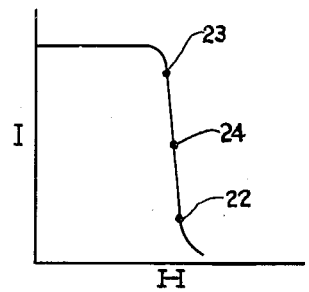
Figure 9 shows the desired characteristic curve for electron current plotted against field strength to obtain the most satisfactory operation of the system.

Figure 9 shows a response curve, or current characteristic, of the type desired occurring with an accurately spaced cathode centrally located within a cylindrical anode. In this graph the electron current I is plotted against the magnetic field flux H through the tube, for a fixed anode potential. The field strength H in the present case is the resultant field in the tube as the latter is turned along with its auxiliary field producing means in the earth's field. The purpose of the curve is to illustrate graphically the sharp cut-off characteristic desirable in the tube to produce the herein described mode of operation of the present system.

Figure 10:
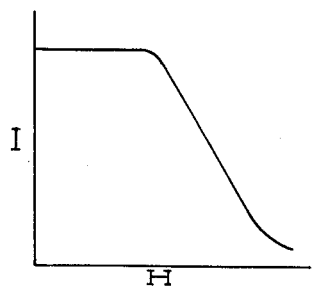
Figure 10 shows a similar characteristic plotted for a vacuum tube of unsymmetrical construction.

Figure 10 shows the characteristic of a vacuum tube of unsymmetrical construction where the anode is not of exact circular form, where the cathode is placed off center within the anode, or where it is not of the equipotential type. This type of characteristic may also occur in filament type tubes where the filament voltage is of appreciable value in relation to the anode voltage. The same result may also be produced by a non-uniform magnetic field density in the auxiliary field, tending to reduce the slope of the curve, and such characteristic may be utilized to advantage in some specialized forms of compass but the characteristic shown in Figure 8 is preferred for the present system.

In operation, when the compass tube is rotated in a horizontal plane until a maximum deflection occurs in the meter or current indicator in the anode circuit, the earth's field counteracted by the auxiliary field produces a minimum flux through the tube which allows a maximum value of electron current to flow. This condition occurs when the axis of the tube points north, with the auxiliary field opposing the earth's field, and the markings on the compass card are arranged to give such indication. When the tube is turned 180 degrees from this position the resultant field therethrough is strengthened due to the fact that the earth's field and the auxiliary field assist each other, and a minimum electron current results, because the tube is operating on the lower portion of its characteristic curve.

In producing south indications the compass tube operates in the region of the point 22 on the characteristic curve in Figure 8, below the center 24 of the steep sloping part of the curve; whereas for the previously described north indicating position it would be operating on the upper part of the steep slope as in the region of point 23. For intermediate positions, namely east or west, the electron current has a mean value indicated at 24, being influenced only by the auxiliary field. The curves in Figures 8 and 9 are characteristics of anode current plotted against magnetic field strengths parallel to the axis of the tube. When the tube is rotated in the fixed field of the earth, only that component parallel to the axis of the tube has any effect upon the tube; hence the tube is inherently directionally responsive.

On a ship or the like where many locations may be desired for reading compass directions the current variations in the compass tube may be amplified by electronic means and arranged to operate calibrated meters or indicating devices such as oscillographs, or means may be provided for rotating the compass tube and operating a relay which flashes a light when the compass tube with its associated compass card is in the true north so as to illuminate a stationary pointer which indicates the direction the ship is traveling.

We have found that as the diameter of the anode is increased, making a longer path for the electrons to travel, much weaker compensating magnetic fields are effective in producing a reduction of electron current when aligned with the earth's field. Also, by lowering the plate potential the electron deflection effects with very weak magnetic fields are more pronounced. A compromise between plate potential and auxiliary field strength is employed, and in practice anode potentials from a fraction of a volt to 45 volts and anode diameters of ¼ inch to 1 inch produced satisfactory results.

As is known in the art in connection with magnetron tubes for the generation of oscillatory currents, the critical value of magnetic field through the tube which is just enough to produce cut off of anode current depends primarily upon the diameter of the anode and the voltage across the tube. It is inversely proportional to the radial anode to cathode distance and directly proportional to the square root of the voltage between cathode and anode. Cathode temperature limits the maximum current through the tube and also affects the cut off point and steepness since it controls the initial velocities with which electrons leave the cathode surface.

Our tests, however, deal with unconventional tube construction and do not agree entirely with the conventional rules and formulae for such tubes. In our tube the anode is made of non-magnetic material, and the anode voltage and electron velocities are very low, causing the tube to operate in a range hitherto unexplored and formulated. The use of a relatively large indirectly heated equipotential cathode with such an anode produces results not previously attained which make the present arrangements especially suited for the purpose intended.

As previously mentioned, the construction of the tube should be of reasonable accuracy. If, however, the cathode is not in the geometrical center of the cylindrical anode, the electron flow under given conditions of anode potential and magnetic field strength may conduct through the space where the distance is shorter and not on the opposite side where the distance is greater, thus resulting in a characteristic curve more sloping, as shown in Figure 9, and under these conditions the anode current may be of a strength somewhere between the maximum and minimum readings and not as sensitive as desirable for the purpose herein set forth.

We have also found that with tubes constructed with filamentary cathodes when employed for this purpose, due to the difference of potential between the ends of the filament, the anode potential relative to various portions of the filament is different, and this prevents a sharp cut off characteristic which is not the case in cathodes which are coated with emissive material and indirectly heated and where the anode potential is uniform between all parts of the cathode. Extremely low voltage filaments, however, may be satisfactory where the filament voltage is only a very small percentage of the anode potential, since the cut off characteristic of the tube is affected only as the square root of this voltage variation.

In the usual magnetron in which the anode cylinder is of substantial length, when magnetic lines of force traverse the electron space within the anode at an angle to the axis of the tube a change in the cut off response curve from a sharp cut off to a more gradual cut off characteristic is produced which is unsuited for the requirements for compass readings where small magnitudes of flux changes are encountered. However, with a tube of the design as previously described, with weak permanent magnets mounted on the axis, the flux entering the combination at an angle merely changes the total flux intensity and not so much the angle of flux, thus keeping the controlling, resultant flux produced by the main field to be explored and the auxiliary field parallel to the axis of the tube. When the axis of the compass tube with its associated auxiliary flux is rotated to an east-west direction the resultant flux through the tube is then approximately equal to the auxiliary field only and indication approximately half way between true north (maximum) and south (minimum) is obtained.

While Figure 1 is only a schematic diagram of the principles involved and it may be assumed that the compass card 10 is to be rotated manually in a horizontal plane until an indication is obtained, any known power means may be employed for rotating the card at various speeds either independently of the signals produced or in response thereto to keep the compass tube constantly trained in a northerly direction. This unit differs from a conventional magnetic compass in that it must be independently rotated to obtain a course reading and will not of itself seek the north as will a magnetic compass. However, various modifications and auxiliary operating mechanisms will suggest themselves to those skilled in the art, depending upon the elaborateness with which the instrument is constructed, for best utilizing the principles of the invention herein disclosed.

On shipboard where accuracy and dependability are paramount the compass tube may be mounted on a non-magnetic extension high above the steel structure of the ship and rotated from a remote point to produce compass readings. The present device might be used in this manner also to serve as a check on the regular compass.

This device operates successfully in the air and also underground or under water and is thus suitable for use in submarine or underground exploration with magnetic fields.

Figure 11 is a schematic plan view of a first preferred embodiment of the device. The vacuum tube and circuit elements comprise parts previously described and bearing the same reference numerals. The vacuum tube 1 and its external auxiliary field producing coil 20 are mounted in fixed relation with respect to the axis 5 on a compass card or other mounting means 10 adapted to support the assembly for rotation in azimuth in the earth's magnetic field. When the compass card 10 or other support is turned on a vertical axis, the longitudinal axis 5 of the tube and coil 20 are rotated through a horizontal angle to different positions in azimuth. In this embodiment the cylindrical anode 2 and cylindrical cathode 3 are concentrically arranged about the axis 5 so that the anode is substantially equidistantly spaced from the cathode. The cathode is indirectly heated by a non-inductive heater 4 energized from the battery 12 under the control of rheostat 32. The cathode itself is an equipotential element connected directly to the negative terminal of the battery 12. The anode 2 is connected to the positive terminal of the battery 25 through the current indicating means 11, the two batteries being connected in series as shown. The auxiliary field coil 20 is also energized from the battery 12 under the control of rheostat 21 to vary the field strength in the manner described. In order to avoid external connections, it is preferred to mount all of the circuit elements directly on the card or other rotatable support 10, but it is to be understood that either one or both of the batteries and the current indicating device 11 may be mounted on a stationary support and connected with the vacuum tube and coil 20 by suitable connecting means permitting rotation of the latter parts, as indicated by the double ended arrow 31.

In the embodiment shown in Figure 12, the cathode 3 is heated by an inductive cathode heater 4 to generate within its own turns the desired auxiliary magnetic field 13, as previously described in Figures 2 and 6. The cathode heater circuit and the anode circuit through the meter 11 are supplied by the same relatively low voltage battery 12 and all of these elements are preferably mounted directly on the card or other rotatable support 10.

The embodiment shown in Figure 13 comprises, in general, the arrangement of Figure 5 mounted on the compass card or other rotatable support 10 with the line 5 designating a longitudinal axis through the concentric cathode and anode of the vacuum tube and through the permanent magnets 6 which produce the auxiliary magnetic field. The magnets 6 are preferably conical in shape and adjustably mounted by screws 27 in slots 26 as in Figures 1 and 3. The cathode heater 4 is preferably non-inductively arranged and connected for energization with a secondary winding 16 in the transformer 14. The anode circuit through the meter 11 includes the secondary winding 17 which is connected in series with the winding 16, as in Figure 5. All of these parts are preferably mounted directly on the compass card or other rotatable member 10 so that the supply leads for the primary transformer winding 15 are the only connections which must be made to the rotating part. The transformer and meter 11 may, however, be mounted on a stationary support and connected by flexible leads or slip rings with the vacuum tube if desired.

Although the present invention has been described in conjunction with certain preferred embodiments, it is to be understood that changes in the arrangement and construction may be resorted to without departing from the spirit of the invention as those skilled in the art will readily understand. All such variations and modifications within the scope of the appended claims are included in the invention.

We claim:

1. Apparatus for directionally detecting low magnetic fields of the order of magnitude of the earth's magnetic field comprising a vacuum tube having an electron emitting equipotential cathode and a cylindrical nonmagnetic anode concentric therewith, indicating means responsive to the magnitude of the electron current in said tube, and means for maintaining an auxiliary magnetic field aligned with the axis of said cathode, said auxiliary field means and the tube being rotatable into alignment with the external magnetic field to be detected, said indicating means giving a maximum indication when the auxiliary field is in alignment and opposing the external field thereby indicating the direction and sense of the external field.

2. Apparatus as claimed in claim 1 in which the means for maintaining the auxiliary field comprises a permanent magnet at each end of the tube and in line with the axis of the cathode and means for varying the spacing of said magnets from the tube to vary the strength of the auxiliary field.

3. Apparatus as claimed in claim 1 in which said auxiliary field maintaining means comprises a coil energized by direct current and means for varying the current in said coil to vary the intensity of the auxiliary field within the tube.

4. Apparatus as claimed in claim 1 in which the heating element for said cathode is non-inductively wound.

5. Apparatus as claimed in claim 1 in which the heating element for said cathode is arranged to maintain said auxiliary unidirectional magnetic field.

WILLIAM L. KAEHNI.
FRANK J. KAEHNI.

REFERENCES CITED

The following references are of record in the file of this patent:

UNITED STATES PATENTS

| Number | Name | Date |
|---|---|---|
| 1,523,778 | Hull | Jan. 20, 1925 |
| 1,617,171 | Smith | Feb. 8, 1927 |
| 1,791,973 | Perryman | Feb. 10, 1931 |
| 1,846,888 | McArthur | Feb. 23, 1932 |
| 1,952,899 | Tear | Mar. 27, 1934 |
| 1,977,615 | Beers | Oct. 23, 1934 |
| 2,032,137 | Lubcke | Feb. 25, 1936 |
| 2,130,124 | Fritz | Sept. 13, 1938 |
| 2,197,042 | Gray | Apr. 16, 1940 |
| 2,225,032 | Carbonara | Dec. 17, 1940 |
| 2,392,370 | Esval et al. | Jan. 8, 1946 |
| 2,406,277 | Bondley | Aug. 20, 1946 |
| 2,439,786 | Anderson | Apr. 20, 1948 |
| 2,444,435 | Fisk | July 6, 1948 |
| 2,448,527 | Hansell | Sept. 7, 1948 |